US008458061B1

(12) United States Patent
Machado et al.

(10) Patent No.: US 8,458,061 B1
(45) Date of Patent: Jun. 4, 2013

(54) METHOD OF STRUCTURING AND ADMINISTERING BORROWER FINANCING

(76) Inventors: Roman Garcia Machado, Caracas (VE); Manuel I. Arcaya Arcaya, Caracas (VE)

( * ) Notice: Subject to any disclaimer, the term of this patent is extended or adjusted under 35 U.S.C. 154(b) by 2507 days.

(21) Appl. No.: 11/194,517

(22) Filed: Aug. 2, 2005

Related U.S. Application Data

(63) Continuation-in-part of application No. 10/658,067, filed on Sep. 10, 2003, now abandoned.

(60) Provisional application No. 60/429,952, filed on Nov. 20, 2003.

(51) Int. Cl.
*G06Q 40/00* (2006.01)
*G06Q 40/06* (2006.01)

(52) U.S. Cl.
CPC ............... *G06Q 40/00* (2013.01); *G06Q 40/06* (2013.01)
USPC .......................................................... 705/35

(58) Field of Classification Search
USPC .......................................................... 705/35
See application file for complete search history.

(56) References Cited

U.S. PATENT DOCUMENTS

| | | | | | |
|---|---|---|---|---|---|
| 4,742,457 | A | * | 5/1988 | Leon et al. ...................... | 705/35 |
| 5,297,026 | A | * | 3/1994 | Hoffman ......................... | 705/14 |
| 5,870,720 | A | | 2/1999 | Chusid et al. ................... | 705/38 |
| 5,933,817 | A | | 8/1999 | Hucal .............................. | 705/39 |
| 5,987,436 | A | | 11/1999 | Halbrook ........................ | 705/38 |
| 6,006,207 | A | | 12/1999 | Mumick et al. ................. | 705/38 |
| 6,067,533 | A | | 5/2000 | McCauley et al. .............. | 705/38 |
| 6,148,293 | A | | 11/2000 | King ............................... | 705/35 |
| 6,345,262 | B1 | | 2/2002 | Madden .......................... | 705/38 |

OTHER PUBLICATIONS

Amortization Loan Software, available @ http://www.ozgrid.com/Services/ammortization-loan-software.htm, last accessed Jul. 7, 2008.*

Amortization Schedules—Simple to Complex, available @ http://www.simplejoe.com/amortizerpro/, last accessed Jul. 7, 2008.*

Prime rate, definition, Wall Street Words: An A to Z Guide to Investment Terms by David L. Scott. Copyright © 2003. Published by Houghton Mifflin, accessed online @ http://dictionary.reference.com/browse/prime%20rate, last accessed 20090802.*

* cited by examiner

*Primary Examiner* — Mary Cheung
*Assistant Examiner* — Daniel L Greene
(74) *Attorney, Agent, or Firm* — James D. Welch

(57) ABSTRACT

A loan structured to require payment of lower monthly payments in payment periods than would be required were conventional loan structuring be applied, accompanied by payment of at least one higher "Mini-Baloon"™ payment.

21 Claims, 2 Drawing Sheets

| YEAR | TRADITIONAL METHOD | | NMT 1 Mini-Balloon | | NMT 2 Mini-Balloon | |
|---|---|---|---|---|---|---|
| | % | Payment | % | Payment | % | Payment |
| 1 | 5.875% | -837.12 | 4.651% | -772.72 | 4.506% | -717.53 |
| 2 | 5.875% | -837.12 | 4.651% | -772.72 | 4.506% | -717.53 |
| 3 | 5.875% | -837.12 | 4.651% | -772.72 | 4.506% | -717.53 |
| 4 | 5.875% | -837.12 | 4.651% | -772.72 | 4.506% | -717.53 |
| 5 | 5.875% | -837.12 | 4.651% | -772.72 | 4.506% | -717.53 |
| 6 | 5.875% | -837.12 | 4.651% | -772.72 | 4.506% | -717.53 |
| 7 | 5.875% | -837.12 | 4.651% | -772.72 | 4.506% | -717.53 |
| 8 | 5.875% | -837.12 | 4.651% | -772.72 | 4.506% | -717.53 |
| 9 | 5.875% | -837.12 | 4.651% | -772.72 | 4.506% | -717.53 |
| 10 | 5.875% | -837.12 | 4.651% | -772.72 | 4.506% | -717.53 |
| 11 | 5.875% | -837.12 | 4.651% | -772.72 | 4.506% | -717.53 |
| 12 | 5.875% | -837.12 | 4.651% | -772.72 | 4.506% | -717.53 |
| 13 | 5.875% | -837.12 | 4.651% | -772.72 | 4.506% | -717.53 |
| 14 | 5.875% | -837.12 | 4.651% | -772.72 | 4.506% | -717.53 |
| 15 | 5.875% | -837.12 | 4.651% | -772.72 | 4.506% | -717.53 |

A method of structuring and administering borrower financing requiring repayment over "Z" periods, comprising the steps of:

a) a lender notes a prevailing market interest rate, and determines a first lower interest rate which is based on said prevailing market interest rate, then offers loans to borrowers with periodic payments determined based on said first lower interest rate, which periodic payments are lower than would be the case were the payments determined based on the prevailing market interest rate;

b) said lender makes, and a borrower accepts a loan which requires borrower payments in each of "X" periods, where "X" is less than "Z", and said lender collects said "X" periodic payments from said borrower, each in an amount based upon said first lower interest rate;

said method being characterized in that said borrower is further required to make at least one mini-balloon payment during said "X" periods, the amount of said at least one mini-balloon payment being less than the amount remaining due on said loan and being based upon a lender determined second lower interest rate, which is also lower than the prevailing market interest rate at the time of payment of said at least one mini-balloon payment;

c) during said "X"th period said lender noting the then prevailing market interest rate and determining a third lower interest rate which is based on the prevailing market interest rate in said "X"th period, and then continuing said loan while requiring payments in each of an additional "Y" periods, where "X" + "Y" is less than or equal to "Z", and collecting said periodic payments from said borrower in an amount based upon said third lower interest rate, which periodic payments are lower than would be the case were said payments determined based on the prevailing market interest rate in said "X"th period;

said method being further characterized in that said borrower is required to make at least one mini-balloon payment during said "Y" periods, said mini-balloon payment being determined based upon a lender determined fourth lower interest rate which is also lower than the prevailing market interest rate at the time of said at least one mini-balloon payment.

FIG. 1

| YEAR | TRADITIONAL METHOD | | NMT 1 Mini-Balloon | | NMT 2 Mini-Balloon | |
|---|---|---|---|---|---|---|
| | % | Payment | % | Payment | % | Payment |
| 1 | 5.875% | -837.12 | 4.651% | -772.72 | 4.506% | -717.53 |
| 2 | 5.875% | -837.12 | 4.651% | -772.72 | 4.506% | -717.53 |
| 3 | 5.875% | -837.12 | 4.651% | -772.72 | 4.506% | -717.53 |
| 4 | 5.875% | -837.12 | 4.651% | -772.72 | 4.506% | -717.53 |
| 5 | 5.875% | -837.12 | 4.651% | -772.72 | 4.506% | -717.53 |
| 6 | 5.875% | -837.12 | 4.651% | -772.72 | 4.506% | -717.53 |
| 7 | 5.875% | -837.12 | 4.651% | -772.72 | 4.506% | -717.53 |
| 8 | 5.875% | -837.12 | 4.651% | -772.72 | 4.506% | -717.53 |
| 9 | 5.875% | -837.12 | 4.651% | -772.72 | 4.506% | -717.53 |
| 10 | 5.875% | -837.12 | 4.651% | -772.72 | 4.506% | -717.53 |
| 11 | 5.875% | -837.12 | 4.651% | -772.72 | 4.506% | -717.53 |
| 12 | 5.875% | -837.12 | 4.651% | -772.72 | 4.506% | -717.53 |
| 13 | 5.875% | -837.12 | 4.651% | -772.72 | 4.506% | -717.53 |
| 14 | 5.875% | -837.12 | 4.651% | -772.72 | 4.506% | -717.53 |
| 15 | 5.875% | -837.12 | 4.651% | -772.72 | 4.506% | -717.53 |

FIG. 2

| YEAR | TRADITIONAL METHOD | | NMT 1 Mini-Balloon | | NMT 2 Mini-Balloon | |
|---|---|---|---|---|---|---|
| | % | Payment | % | Payment | % | Payment |
| 1 | 5.875% | -591.54 | 4.651% | -546.03 | 3.554% | -507.03 |
| 2 | 6.000% | -599.55 | 4.772% | -553.43 | 3.671% | -513.90 |
| 3 | 6.100% | -605.99 | 4.868% | -559.38 | 3.765% | -519.42 |
| 4 | 6.500% | -632.07 | 5.254% | -583.45 | 4.139% | -541.77 |
| 5 | 6.200% | -612.47 | 4.965% | -565.38 | 3.858% | -524.97 |
| 6 | 6.333% | -621.13 | 5.093% | -573.35 | 3.983% | -532.39 |
| 7 | 6.250% | -615.72 | 5.013% | -568.35 | 3.905% | -527.76 |
| 8 | 6.400% | -625.51 | 5.158% | -577.39 | 4.045% | -536.15 |
| 9 | 6.215% | -613.44 | 4.979% | -566.25 | 3.872% | -525.81 |
| 10 | 6.122% | -607.42 | 4.889% | -560.69 | 3.785% | -520.64 |
| 11 | 6.055% | -603.09 | 4.825% | -556.70 | 3.722% | -516.94 |
| 12 | 6.000% | -599.55 | 4.772% | -553.43 | 3.671% | -513.90 |
| 13 | 5.975% | -597.94 | 4.747% | -551.95 | 3.648% | -512.52 |
| 14 | 5.955% | -596.66 | 4.728% | -550.76 | 3.629% | -511.42 |
| 15 | 5.900% | -593.14 | 4.675% | -547.51 | 3.577% | -508.40 |

FIG. 3

METHOD OF STRUCTURING AND ADMINISTERING BORROWER FINANCING

This Application is a Continuation In Part of Utility Application Ser. No. 10/658,067 Filed Sep. 10, 2003 now abandoned and there via claims benefit of Provisional Application Ser. No. 60/429,952 filed Nov. 20, 2002.

TECHNICAL AREA

The disclosed invention relates to loan structuring and repayment, and more particularly to loan structuring which requires payment of lower monthly payments in a payment period than would be required were conventional loan structuring be applied, accompanied by payment of at least one higher "Mini-Balloon"™ payment in said payment period.

BACKGROUND

The disclosed invention has its roots in the insight of the Venezuelan Inventors who each have extensive experience and credentials in the Venezuelan Banking Community.

It should be appreciated that the Venezuelan economy is not predominately market driven as is that in the U.S. In fact, it is common practice for workers in Venezuela to receive wages at some fixed amount for eleven months of the year, and in the twelfth month, (ie. December), receive a multiple of said wages, (eg. two or three times the monthly rate) regardless of market status. That is, workers in Venezuela know they can count on receiving said extra income in said twelfth month. It is also noted that in recent years Interest rates in Venezuela have been very unpredictable. In that light, it has been the case that Variable Rate Mortgages have been subject to Foreclosure where Borrowers have been unable to keep pace with high monthly payments based on Prevailing Market Interest Rates.

With the present invention in mind a Search of Patents was conducted with the following Patents being identifid thereby:
- U.S. Pat. No. 6,345,262 to Madden which describes a computer generated plan wherein the lender shares in appreciation in return for receiving little or no interest.
- U.S. Pat. No. 6,148,293 to King describes use of Government Securities as a basis for periodically recalculating the interest rate of a loan.
- U.S. Pat. No. 6,006,207 to Mumick et al. describes a loan which provides incentives to induce prepayment when the prevailing interest rate is higher that that of the loan.
- U.S. Pat. No. 6,067,533 to McCauley et al. describes an approach to determining if non-performing loans should be foreclosed or restructured at a lower interest rate.
- U.S. Pat. No. 5,987,436 to Halbrook describes an approach to lending that allows a borrower to invest in interest bearing instruments which generate income to help pay the loan payments
- U.S. Pat. No. 5,933,817 to Hucal describes a loan method wherein the interest rate depends on the fraction of a loan balance repaid in a given billing cycle.
- U.S. Pat. No. 5,870,720 to Chusid et al. describes a method of restructuring loans into multiple parts, in for instance, over-leveraged situations.

Even in view of the prior art, need remains for loan structuring which allows repayment in reduced amounts in most periods of a payment period, accompanied by payment of at least one higher amount "Mini-Balloon"™ payment in each of said payment periods.

DISCLOSURE OF THE INVENTION

With the insight developed in the foregoing, it is now disclosed that the Inventors herein have conceived a method of structuring and administering borrower financing which in effect provides borrowers reduced monthly loan payments for most months in a year, but requires that at least one "Mini-Balloon"™ payment be made each year. It can be easily appreciated that in Venezuela the ""Mini-Balloon"™ payment would most likely be paid by workers in a twelfth month when they receive higher income, and that they would pay lower monthly loan payments the rest of the months in a year. The approach utilizes algorithms carried out in computing means.

While the present invention thus has its roots in a somewhat unique setting, the basic concept has wider application. In effect, it is an approach to financing which allows a borrower to pay lower monthly payments for most months in a year, and supplement it with one or more "Mini-Balloon"™ payment (s) in one or two or more months each year. Such a financial instrument might be especially attractive to someone who, for instance, receives an annual check in a month each year from, say, a trust or estate etc.

Properly managed by a borrower, the benefits thereto are fairly obvious from the foregoing discussion, however, the plan also benefits Lenders who can use the "Mini-Balloon"™ payments, the amounts of which are calculated based upon a formula which uses the Prevailing Market Interest Rate at the time of their payment, to earn a greater return than would otherwise be possible.

For emphasis it is again stated that the amount of a "Mini-Balloon"™ payment is determined based upon Prevailing Market Interest Rates at the time when a Borrower pays a "Mini-Balloon"™ payment, thus provides a Lender a relatively large amount of money to invest at that time, from which a return can be appreciated over time. Properly managed the Lender can obtain a greater return on said relatively large amount of money than could be realized were the monthly payments were higher and uniformly paid.

It is noted that the present approach to Borrower financing does not guarantee that in any specific year in the life of a loan, a Borrower will pay a total lesser amount than would be the case if monthly payments were made based upon a Borrower simply paying twelve equal higher payments based on the Prevailing Market Interest Rate. The Borrower in fact might pay more, the same or less in any specific year than would be the case under conventional financing. Thus the great benefit to a Borrower under the present invention method approach is that during most months of a year a lower payment will be required thereof, with a "Mini-Balloon"™ payment being required in one or spread over a few months.

The terminology "Mini-Balloon"™ is adopted here as it is intuitive. Most people are familiar with Conventional Balloon Mortgages wherein relatively low monthly payments are made for years, which payments do not Amortize both Interest and Principal on a Loan Amount, but which Balloon Mortgages have a provision that at the end of some period the amount owing is due and payable in full. The present invention method provides that payments are made in an amount below that required to amortize both Interest and Principal in, typically, eleven months of a year, but that a "Mini-Balloon"™ payment is payable some time during said year which can be structured to allow payment at any time during the year, and even in more than one installment. And, it is noted, the payment times can be determined by either the Lender or the Borrower as they agree. The important thing to realize is that the amount of the "Mini-Balloon"™ is determined based upon the Prevailing Market Interest Rate at the time of the payment thereof, hence, provides a Lender a relatively large sum at once to invest at what can be viewed as the start of an effective "Fiscal Year".

More specifically, a present method of structuring and administering borrower financing requiring repayment over "Z" periods, comprising the steps of:

a) a lender notes a prevailing market interest rate, and determines a first lower interest rate which is based on said prevailing market interest rate, then offers loans to borrowers with periodic payments determined based on said first lower interest rate, which periodic payments are lower than would be the case were the payments determined based on the prevailing market interest rate;

b) said lender makes, and a borrower accepts a loan which requires borrower payments in each of "X" periods, where "X" is less than "Z", and said lender collects said "X" periodic payments from said borrower, each in an amount based upon said first lower interest rate;

said method being further characterized in that said borrower is further required to make at least one "Mini-Balloon"™ payment during said "X" periods, the amount of said at least one "Mini-Balloon" payment being less than the amount remaining due on said loan and being based upon a lender determined second lover interest rate, which is also lower than the prevailing market interest rate at the time of payment of said at least one "Mini-Balloon"™ payment.

The "Mini-Balloon"™ can be made in any of the 12 months, but under the Venezuelan example, the 12th month would be preferred. In addition, to distinguish over Conventional Balloon Payment Loans, it must be appreciated that a "Mini-Balloon"™ payment made during said "X" periods does not satisfy the total amount due on the loan. A final "Z"th payment might include a Conventional Balloon in an amount sufficient to satisfy the total outstanding balance, but no "Mini-Balloon"™ payment in a period which is less than "Z" will be in a loan satisfying full-pay-off amount at the time paid.

The method will typically provide that the lender determines the first and second lower interest rates by applying a fixed algorithm to the prevailing market interest rates at the time of determination. Thus the primary variable entered to the algorithm will be the Prevailing Market Interest Rate.

As mentioned, two "Mini-Balloon"™ payments can made during said "X" periods. In that case the amount of said first "Mini-Balloon"™ payment will be a percentage of an amount determined based upon a lender determined interest rate which is lower than the then prevailing market interest rate at the time of payment of said first "Mini-Balloon"™ payment. The second "Mini-Balloon"™ payment will be an amount determined based upon a lender determined lower interest rate which is lower than the prevailing market interest rate at the time of payment of said second "Mini-Balloon"™ payment, minus the amount of the first "Mini-Balloon"™ payment.

The method of structuring and administering borrower financing will typically be applied in long term financing. Hence the basic procedure will be repeated in the second and follow-on years. For instance, during said "X" period said lender will note the then prevailing market interest rate and determine a third lower interest rate which is based on the prevailing market interest rate in said "X"th period, and continue said loan while requiring payments in each of an additional "Y" periods, where "X"+"Y" is less than or equal to "Z". Periodic payments from said borrower will then be in an amount based upon said third lower interest rate, which periodic payments are lower than would be the case were said payments determined based on the prevailing market interest rate in said "X"th period. The method will be further characterized in that said borrower is again required to make at least one "Mini-Balloon"™ payment during said "Y" periods, said "Mini-Balloon"™ payment being determined based upon a lender determined forth lower interest rate which is based upon the prevailing market interest rate at the time of said at least one "Mini-Balloon"™ payment.

Said method of structuring borrower financing will typically involve the lender determining the third and forth lower interest rates by applying a fixed algorithm to the prevailing market interest rates at the time of determination, "Y" will typically be 12, with a single "Mini-Balloon"™ will typically being paid in said 12th period. Where two "Mini-Balloon"™ payments are made during said "Y" periods, the amount of said first "Mini-Balloon"™ payment being a percentage of an amount determined based upon a lender determined interest rate which is lower than the then prevailing market interest rate at the time of payment of said first "Mini-Balloon"™ payment; and the-second "Mini-Balloon"™ payment being in an amount determined based upon a lender determined lower interest rate which is lower than the prevailing market interest rate at the time of payment of said second "Mini-Balloon"™ payment, minus the amount of the first "Mini-Balloon"™ payment. Typically "X" and "Y" will be equal, and both 12. An additional initiation fee can also be charged at the time when said lender makes, and a borrower accepts said loan.

In the foregoing, it is to be understood that an additional step comprises providing a system for storing information and performing calculations, and application thereof to receive and store, on readable media such as magentic, ROM, CD etc. media, including over the Internet from servers and the like, information pertaining to interest rates, then perform calculations to provide "Mini-Balloon"™ rates and amounts and other rates and amounts. Said system can also provide means for displaying stored and/or calculated data. Said provided system comprises computer processor means or equivalent for carrying out the identified functions.

The disclosed invention will be better understood by reference to the Detailed Description Section in combination with the Drawings.

SUMMARY

It is therefore the primary purpose and/or objective of the disclosed invention to teach a loan structuring method which requires payment of lower monthly payments in a payment period than would be required were conventional loan structuring applied, accompanied by payment of at least one higher "Mini-Balloon"™ payment in said payment period.

It is another purpose and/or objective of the disclosed invention to teach use of a system for storing information and performing calculations of the amounts of "Mini-Balloons"™, and in storing the results of said calculations in the practice of the disclosed loan structuring method.

Other purposes and/or objectives of the disclosed invention will become apparenet upon a reading of the Specification and Claims.

BRIEF DESCRIPTION OF THE DRAWINGS

FIG. 1 shows a flow chart of a representative disclosed invention method.

FIGS. 2 and 3 show, in matrix form, a comparison of monthly payments required over 15 years under traditional and present invention approachs, for both fixed and variable rate mortgages and where one or two "Mini-Balloon"™ payments are required.

DETAILED DESCRIPTION

FIG. 1 shows, in flow chart form, of a representative disclosed invention method sequence of steps. Said FIG. 1 method was described in the Disclosure of the Invention Section of this Specification.

FIG. 2 shows, in matrix format, a comparison of monthly payments required over 15 years for traditional and present invention approaches, assuming a Fixed Interest Rate loan. Shown are cases where one month and two month amount MINI-BALLOON™ payments, (corresponding to $772.72 and $1435.06 in the shown example), are made in addition to the lower, (compared to the traditional approach monthly payments), each year.

FIG. 3 shows, in matrix format, a comparison of monthly payments required over 15 years for traditional and present invention approaches, assuming a Variable Interest Rate. Again, cases where one month and two month amount MINI-BALLOON™ payments are made in addition to the lower, (compared to the traditional approach monthly payments), each year.

Note that in the examples presented in in FIGS. 2 and 3, the Traditional approach involves no MINI-BALLOON™ payments, which are assumed paid in the present invention method examples. Further, both examples assume a Present Value—$100,000 to be paid over 15 years in 12 monthly payments per year, assuming a 5.875% Interest Rate. Note how the Effective Interest Rate used to calculate monthly payments under under the present invention method is lower than the corresponding Traditional approach interest rate. The amounts in FIGS. 2 and 3 were determined utilizing a system for storing information and performing calculations, which in the specific case was a personal comuputer system.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:

1. A computer processor implemented method of structuring and administering borrower financing requiring repayment over "Z" periods, comprising the steps of:
   a) providing a computer processor based system capable of storing information, and performing calculations and displaying results;
   b) said computer processor based system, noting a prevailing market interest rate, and determining a first lower interest rate which is based on said prevailing market interest rate, then said computer processor based system determining terms of a loan with periodic payments determined based on said first lower interest rate, which periodic payments are lower than would be the case were the payments determined based on the prevailing market interest rate;
   c) a lender, using said computer processor based system, making, and a borrower, using said computer processor based system, accepting a loan which requires borrower payments in each of "X" periods, where "X" is less than "Z", and said lender collecting said "X" periodic payments from said borrower, each in an amount based upon said first lower interest rate;
   said method being characterized in that said borrower is further required to make at least one mini-balloon payment during said "X" periods, the amount of said at least one mini-balloon payment being determined by said computer processor based system, and being less than the amount remaining due on said loan and being based upon a computer processor based system determined, second lower interest rate, which is also lower than the prevailing market interest rate at the time of payment of said at least one mini-balloon payment;
   said method further comprising said computer processor based system displaying at least the mini-balloon amounts.

2. A method as in claim 1, in which two mini-balloon payments are made during said "X" periods, the amount of said first mini-balloon payment being determined by said computer processor based system as a percentage of an amount determined based upon a computer processor based system determined interest rate which is lower than the then prevailing market interest rate at the time of payment of said first mini-balloon payment; and the second mini-balloon payment being an amount determined by said computer processor based system, based upon a lower interest rate which is lower than the prevailing market interest rate at the time of payment of said second mini-balloon payment, minus the amount of the first mini-balloon payment.

3. A method as in claim 1, in which an additional initiation fee is charged at the time when said lender makes, and a borrower accepts said loan.

4. A method as in claim 1, in which the "Z"th payment is a conventional loan satisfying full-pay-off Balloon-payment amount, said amount being determined by using said computer processor based system.

5. A method as in claim 1, in which "X" is 12.

6. A method as in claim 5, in which one mini-balloon in said "X" periods is paid in the 12th period.

7. A method as in claim 2, in which said computer processor based system determines the first and second lower interest rates by applying a fixed algorithm to the prevailing market interest rates at the time of determination.

8. A method as in claim 1, which during said "X" period further comprises said computer processor based system noting the then prevailing market interest rate, and said computer processor based system determining a third lower interest rate which is based on the prevailing market interest rate in said "X"th period, and then said lender continuing said loan while requiring periodic payments in each of an additional "Y" periods, where "X"+"Y" is less than or equal to "Z", and collecting said periodic payments from said borrower in an amount based upon said third lower interest rate, which periodic payments are lower than would be the case were said payments determined based on the prevailing market interest rate in said "X"th period, said payments being determined by application of said computer processor based system;
said method being further characterized in that said borrower is required to make at least one mini-balloon payment during said "Y" periods, said mini-balloon payment being determined by said computer processor based system, and based upon a computer processor based system determined forth lower interest rate which is also lower than the prevailing market interest rate at the time of said at least one mini-balloon payment, said payment being determined by said computer processor based system.

9. A method as in claim 6, in which said computer processor based system determines the third and forth lower interest rates by applying a fixed algorithm to the prevailing market interest rates at the time of determination.

10. A method as in claim 8, in which two mini-balloon payments are made during said "Y" periods, the amount of said first mini-balloon payment being a percentage of an amount based upon a computer processor based system determined interest rate which is lower than the then prevailing market interest rate at the time of payment of said first mini-balloon payment; and the second mini-balloon payment being in an amount determined based upon a computer processor based system determined lower interest rate which is lower than the prevailing market interest rate at the time of payment of said second mini-balloon payment, minus the amount of the first mini-balloon payment.

11. A method as in claim 8, in which "X" and "Y" are equal.

12. A method as in claim 8, in which "X" and "Y" are both 12.

13. A method as in claim 8, in which "Y" is 12.

14. A method as in claim 13, in which one mini-balloon in said "Y" periods is paid in the 12th period.

15. A computer processor implemented method of structuring and administering borrower financing requiring repayment over "Z" periods, comprising the steps of:
   a) providing a computer processor based system capable of storing information, performing calculations and displaying results;
   b) said computer processor based system, noting a prevailing market interest rate, and determining a first lower interest rate which is based on said prevailing market interest rate, then said computer processor based system determining terms of a loan with periodic payments determined based on said first lower interest rate, which periodic payments are lower than would be the case were the payments determined based on the prevailing market interest rate;
   c) a lender, using said computer processor based system, making, and a borrower, using said computer processor based system, accepting, a loan which requires borrower payments in each of "X" periods, where "X" is less than "Z", and said lender collecting said "X" periodic payments from said borrower, each in an amount based upon said first lower interest rate;

said method being characterized in that said borrower is further required to make at least one mini-balloon payment during said "X" periods, the amount of said at least one mini-balloon payment being determined by said computer processor based system, and being less than the amount remaining due on said loan and being based upon a computer processor based system determined second lower interest rate, which is also lower than the prevailing market interest rate at the time of payment of said at least one mini-balloon payment;

said method further comprising:

during said "X"th period said computer processor based system noting the then prevailing market interest rate and determining a third lower interest rate which is based on the prevailing market interest rate in said "X"th period, and then said lender continuing said loan while requiring periodic payments in each of an additional "Y" periods, where "X"+"Y" is less than or equal to "Z", and collecting said periodic payments from said borrower in an amount based upon said third lower interest rate, which periodic payments are lower than would be the case were said payments determined based on the prevailing market interest rate in said "X"th period;

said method being further characterized in that said borrower is required to make at least one mini-balloon payment during said "Y" periods, said mini-balloon payment being determined by said computer processor based system, based upon a computer processor based system determined forth lower interest rate which is also lower than the prevailing market interest rate at the time of said at least one mini-balloon payment;

said method further comprising said computer processor based system displaying at least the mini-balloon amounts.

16. A method as in claim 14, in which mini-balloon payments are made in said "X"th and said "Y"th periods.

17. A method as in claim 15 in which two mini-balloon payments are made during at least one of said "X" and "Y" periods, the amount of said first mini-balloon payment being a percentage of an amount based upon a computer processor based system determined interest rate which is lower than the then prevailing market interest rate at the time of payment of said first mini-balloon payment; and the second mini-balloon payment being an amount based upon a computer processor based system determined lower interest rate which is lower than the prevailing market interest rate at the time of payment of said second mini-balloon payment, minus the amount of the first mini-balloon payment.

18. A method as in claim 15, in which an additional initiation fee is charged at the time when said lender makes, and a borrower accepts said loan; the amount thereof being determined by using said computer processor based system.

19. A method as in claim 15, in which the "Z"th payment is a conventional loan satisfying full-pay-off Balloon-payment amount, said amount being determined by using said computer processor based system.

20. A method as in claim 15, in which "X" and "Y" are equal.

21. A method as in claim 20, in which "X" and "Y" are both 12.

\* \* \* \* \*